(12) United States Patent
Kondo et al.

(10) Patent No.: US 8,881,606 B2
(45) Date of Patent: Nov. 11, 2014

(54) FLUID FLOW RATE MEASURING DEVICE AND WATER METER

(71) Applicant: Semiconductor Components Industries, LLC, Phoenix, AZ (US)

(72) Inventors: Hideo Kondo, Ora-gun (JP); Yoshiaki Yonezawa, Ora-gun (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 79 days.

(21) Appl. No.: 13/772,052

(22) Filed: Feb. 20, 2013

(65) Prior Publication Data

US 2013/0220028 A1    Aug. 29, 2013

(30) Foreign Application Priority Data

Feb. 24, 2012 (JP) ................. 2012-038339

(51) Int. Cl.
    *G01F 15/00*      (2006.01)
    *G01F 1/05*      (2006.01)

(52) U.S. Cl.
    CPC ....................... *G01F 1/05* (2013.01)
    USPC ..................................... 73/861.77

(58) Field of Classification Search
    USPC .................. 73/861.77, 861.04, 215
    See application file for complete search history.

(56) References Cited

U.S. PATENT DOCUMENTS 7,311,001 B2 * 12/2007 Liu et al. ................. 73/215
2008/0288181 A1 * 11/2008 Lucero ................. 702/23

FOREIGN PATENT DOCUMENTS

JP     2008-224320     9/2008

* cited by examiner

*Primary Examiner* — Jewel V Thompson
(74) *Attorney, Agent, or Firm* — Rennie W. Dover

(57) ABSTRACT

There is offered a water meter that requires no coil so that its cost is reduced. The water meter is formed to include an impeller, a rotation reduction unit, a first circular plate, a second circular plate, a rotation detection unit and an arithmetic unit. The rotation detection unit forms first, second and third combination capacitors with a switching circuit. The rotation detection unit detects changes in capacitances of the first, second and third combination capacitors associated with a rotation of the first circular plate. The arithmetic unit is configured so as to electrically detect the rotation angle θ of the first circular plate based on the changes in the capacitances.

20 Claims, 16 Drawing Sheets

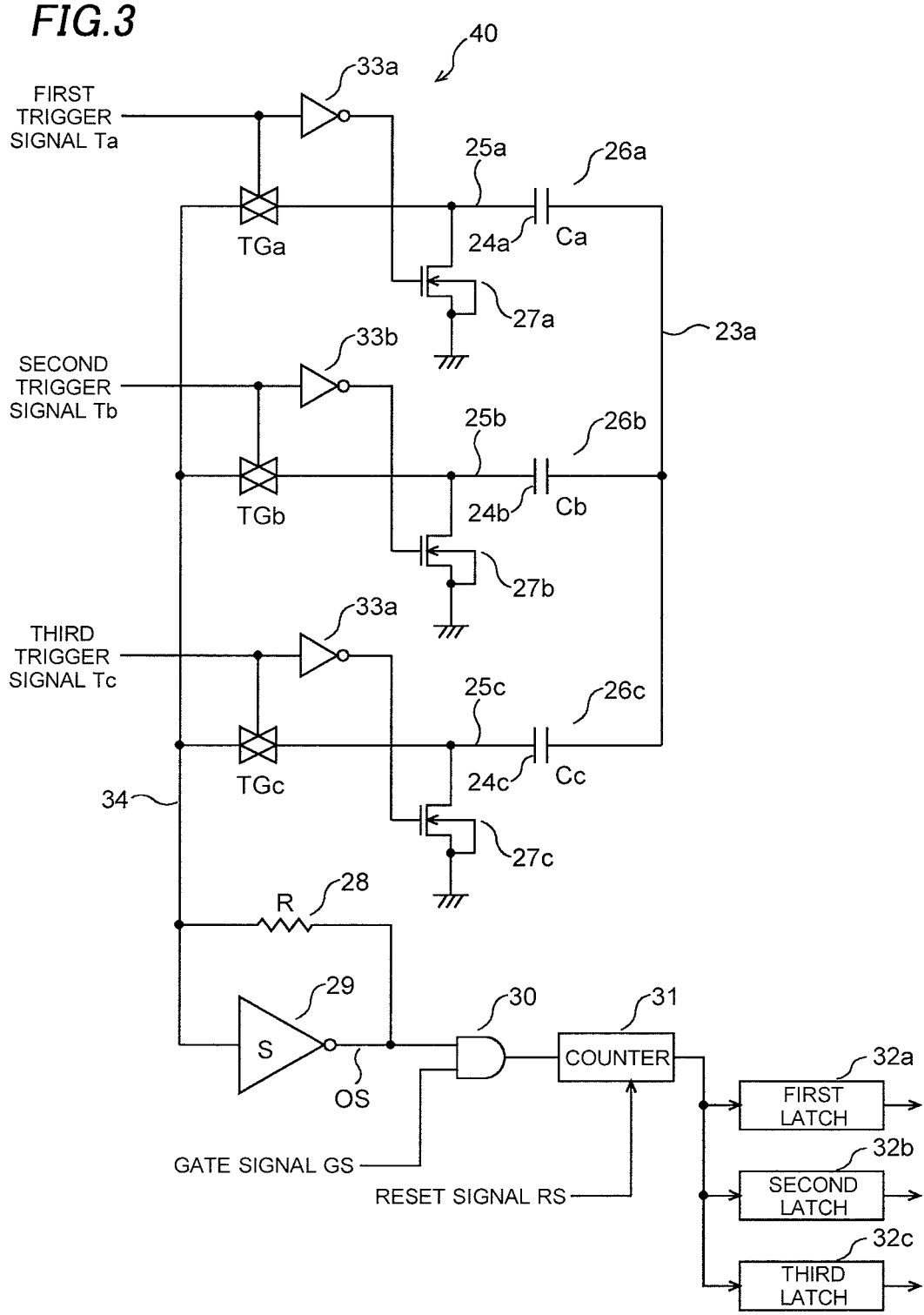

FIRST MODE

SECOND MODE

THIRD MODE

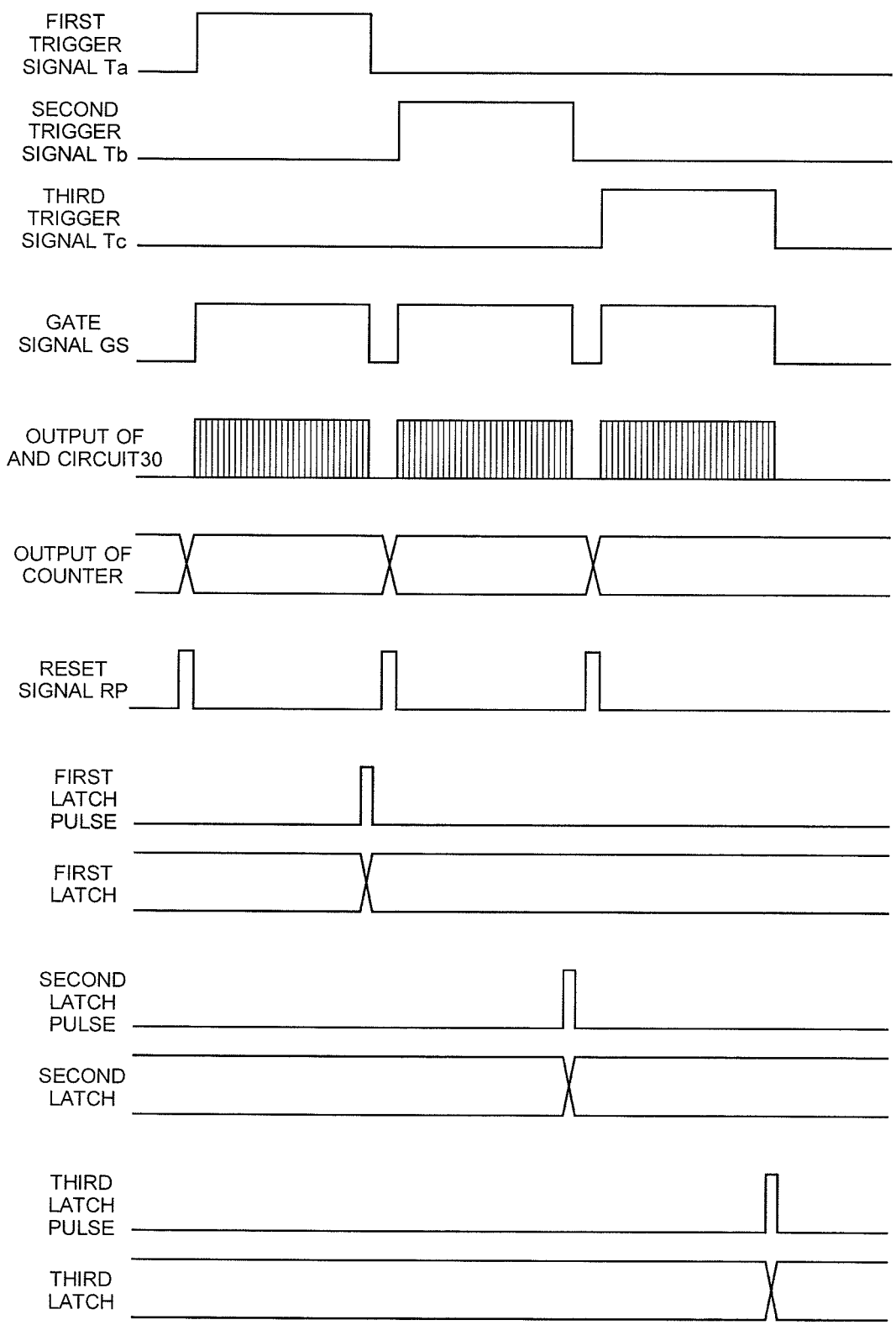

FIRST MODE

SECOND MODE

THIRD MODE

FIRST MODE

SECOND MODE

THIRD MODE

FIRST MODE

SECOND MODE

THIRD MODE

FLUID FLOW RATE MEASURING DEVICE AND WATER METER

CROSS-REFERENCE OF THE INVENTION

This application claims priority from Japanese Patent Application No. 2012-038339, filed Feb. 24, 2012, the content of which is incorporated herein by reference in its entirety.

BACKGROUND OF THE INVENTION

1. Field of the Invention

This invention relates to a fluid flow rate measuring device and a water meter that are capable of electronically measuring a flow rate of a liquid or a gas.

2. Description of the Related Art

There has been known an electronic water meter using a magnetic sensor or an LC resonant circuit. The water meter using the magnetic sensor is disclosed in Japanese Patent Application Publication No. 2008-224320, for example. The water meter using the LC resonant circuit is used in Europe in recent years. The water meter using the LC resonant circuit is hereafter explained.

FIG. 14 is a schematic drawing showing a structure of the water meter using the LC resonant circuit. The water meter is composed of an impeller 1, a rotation reduction unit 2, a circular plate 3, a rotation detection unit 6 and an arithmetic unit 7. The rotation detection unit 6 has a first coil 4a, a second coil 4b, a first capacitor 5a and a second capacitor 5b.

The impeller 1 is placed in a water pipe and rotates at a rotation speed proportional to a flow rate (an amount of water flowing through the water pipe per unit time) of the water. The rotation speed of the impeller 1 is reduced by the rotation reduction unit 2 and transferred to a rotating shaft running through a center of the circular plate 3. The rotation reduction unit 2 is formed including a small gear 2a having a smaller number of teeth and a large gear 2b having a larger number of teeth and meshing with the small gear 2a, and its reduction rate is determined by a ratio between the number of teeth of the small gear 2a and the number of teeth of the large gear 2b. The number of gears included in the rotation reduction unit 2 and the number of teeth of each of the gears may be increased or decreased in accordance with the reduction rate required. As a result, the circular plate 3 rotates at a rotation speed (one rotation per second, for example) that is significantly smaller than the rotation speed of the impeller 1.

The circular plate 3 is composed of a metal portion 3a (made of copper, for example) in a semicircular shape disposed on its principal surface and an insulator portion 3b (made of resin, for example) in a semicircular shape disposed on the rest of the principal surface other than the metal portion 3a, as shown in FIG. 15.

The first coil 4a and the second coil 4b are disposed above the circular plate 3. The first coil 4a and the first capacitor 5a form a first LC resonant circuit, while the second coil 4b and the second capacitor 5b form a second LC resonant circuit.

An oscillation signal is generated when the first LC resonant circuit is activated by applying an activation pulse, for example. Attenuation of the oscillation signal differs depending on whether the first coil 4a is above the metal portion 3a or above the insulator portion 3b. That is, when the first coil 4a is above the metal portion 3a, the first coil 4a loses more energy because an eddy current is caused in the metal portion 3a due to electromagnetic induction by the first coil 4a. As a result, the oscillation signal of the first LC resonant circuit attenuates relatively fast.

When the first coil 4a is above the insulator portion 3b, on the other hand, the attenuation of the oscillation signal of the first LC resonant circuit is determined by internal resistances of the coil, transistor, capacitor and the like, and is relatively slow because no eddy current is caused. Therefore, by periodically sampling a change in the attenuation of the oscillation signal, it is made possible to obtain information on a location of the first coil 4a above the circular plate 3 (that is, whether the coil 4a is above the metal portion 3a or above the insulator portion 3b) at each of the sampling times. The arithmetic unit 7 finds the rotation speed of the circular plate 3 from a change in the information on the location of the first coil 4a over the time.

Then, the arithmetic unit 7 calculates the rotation speed of the impeller 1 from the rotation speed of the circular plate 3 and the reduction rate of the rotation reduction unit 2. The arithmetic unit 7 also calculates the flow rate of the water from known correlation between the rotation speed of the impeller 1 and the flow rate of the water. The arithmetic unit 7 is a microcomputer, for example.

It is understood that the rotation speed of the circular plate 3 can be obtained with the first LC resonant circuit only when it is determined based on the measurement principle as described above. However, it is made possible to detect not only the rotation speed but also a direction of the rotation of the circular plate 3 at the same time by using both the first and second LC resonant circuits. In this case, a minimum sampling rate to detect the location by the first and second LC resonant circuits is represented by Equation (1):

$$\text{Minimum Sampling Rate} = 2 \times 360°/\alpha \times RV\text{max} \quad (1)$$

where $\alpha$ denotes an angle between the first coil 4a and the second coil 4b, that is, an angle formed by a line connecting the first coil 4a and the center O of the circular plate 3 and a line connecting the second coil 4b and the center O of the circular plate 3. RVmax denotes a maximum rotation speed of the circular plate 3.

When $\alpha$ is 90°, for example, the minimum sampling rate is 8×RVmax. Assuming that the maximum rotation speed of the circular plate 3 is one rotation per second, the minimum sampling rate comes to be 8/second.

Next, a concrete structure of the rotation detection unit 6 is explained referring to FIG. 16. Since the first and second LC resonant circuits have the same structure, only a portion including the first LC resonant circuit is explained below.

As shown in the drawing, the rotation detection unit 6 is formed to include an activation transistor 10 made of a P-channel type MOS transistor, a resistor R1 for current limiting, the first coil 4a, the first capacitor 5a, a comparator 11, a latch circuit 12, a power supply line 13 and a capacitor 14 for smoothing. The first LC resonant circuit is formed by connecting the first coil 4a and the first capacitor 5a in parallel.

When the activation pulse GP of an L level (0 V) is applied to the activation transistor 10, the activation transistor 10 is turned on for a period corresponding to a pulse width tw of the activation pulse GP, as shown in FIG. 17. The activation pulse GP is periodically generated in accordance with the sampling rate. When the activation transistor 10 is turned on accordingly, a current is supplied from the power supply line 13 to the first LC resonant circuit through the activation transistor 10 to activate the first LC resonant circuit so that the first oscillation signal is generated at a node N. An oscillation frequency fosc of the first oscillation signal is represented by Equation (2):

$$f_{osc} = 1/2\pi \times \sqrt{1/LC} \quad (2)$$

where L denotes an inductance of the first coil 4a, and C denotes a capacitance of the first capacitor 5a.

The comparator 11 compares the first oscillation signal with a reference voltage Vref. A center voltage of the first oscillation signal is set to 0.5 VDD, while the reference voltage Vref is set to a voltage between 0.5 VDD and VDD. Thus, an output from the comparator 11 becomes an H level when the first oscillation signal is larger than Vref, and becomes the L level when the first oscillation signal is smaller than Vref. The output from the comparator 11 makes a pulse train.

The latch circuit 12 latches the pulse outputted from the comparator 11 in response to a latch pulse RP. The latch circuit 12 is structured so that it latches the pulse outputted from the comparator 11 in response to the latch pulse RP that is generated during a measuring period t2 after a predetermined delay time t1 from the generation of the activation pulse GP.

FIG. 17 shows the first oscillation signal in the case where the first coil 4a is above the insulator portion 3b, thus the attenuation of the first oscillation signal is relatively slow. Therefore, there is a period of time within the measuring period t2 during which the first oscillation signal is higher than the reference voltage Vref. Since the comparator 11 outputs the pulse during the period, the latch circuit 12 latches the pulse and holds data "1" (H level).

When the first coil 4a is above the metal portion 3a, on the other hand, the attenuation of the oscillation signal is relatively fast. As a result, the latch circuit 12 holds data "0" (L level), since the oscillation signal attenuates to a voltage lower than the reference voltage Vref in the measuring time t2 and the comparator 11 does not output the pulse.

Therefore, the rotation detection unit 6 including the first and second LC resonant circuits is capable of identifying four rotation states (a)-(d), as shown in FIGS. 18 and 19.

In the rotation state (a), the first coil 4a is above the metal portion 3a, while the second coil 4b is above the insulator portion 3b. At that time, the first oscillation signal from the first LC resonant circuit attenuates faster than the second oscillation signal from the second LC resonant circuit. Therefore, the data held by the latch circuits 12 in the first and second LC resonant circuits is represented as (0, 1).

In the rotation state (b), both the first coil 4a and the second coil 4b are above the metal portion 3a. At that time, both the first oscillation signal and the second oscillation signal attenuate fast. Therefore, the data held by the latch circuits 12 in the first and second LC resonant circuits is represented as (0, 0).

In the rotation state (c), the first coil 4a is above the insulator portion 3b, while the second coil 4b is above the metal portion 3a. At that time, the second oscillation signal attenuates faster than the first oscillation signal. Therefore, the data held by the latch circuits 12 in the first and second LC resonant circuits is represented as (1, 0).

In the rotation state (d), both the first coil 4a and the second coil 4b are above the insulator portion 3b. At that time, both the first oscillation signal and the second oscillation signal attenuate slowly. Therefore, the data held by the latch circuits 12 in the first and second LC resonant circuits is represented as (1, 1).

Therefore, it is possible to find a rotation period T of the circular plate 3 based on the change in the data held by the two latch circuits 12 over time. The rotation speed of the circular plate 3 is 1/T that is an inverse of the rotation period T. Since single sampling gives the data showing one of the four rotation states (a)-(d), measurement precision of the rotation speed of the circular plate 3 can be increased by increasing the sampling rate.

It is also possible to determine the direction of the rotation of the circular plate 3 base on the order of appearance of the four rotation states (a)-(d). That is, when the rotation states appear in the order (a)→(b)→(c)→(d), it is understood that the circular plate 3 rotates counterclockwise, and when the rotation states appear in the order (d)→(c)→(b)→(a) to the contrary, it is understood that the circular plate 3 rotates clockwise, as shown in FIG. 19.

However, the water meter described above has a problem of high cost because it uses expensive coils. It also has a problem that the LC resonant circuit malfunctions when a permanent magnet is brought close to the coil.

In addition, a spike current flows through the power supply line 13 because the activation transistor 10 is instantaneously turned on by applying the activation pulse GP when the LC resonant circuit is activated. The spike current causes a voltage change in the power supply line 13, which may cause malfunctioning of the circuit. Therefore, the smoothing capacitor 14 of a large capacitance is required to suppress the voltage change.

Furthermore, a reference clock of high frequency is required in order to precisely control the pulse width tw of the activation pulse GP so that the LC resonant circuit is activated. Since the pulse width tw of the activation pulse GP is about 0.8 μsec, the reference clock of about 10 MHz is required. Precisely controlling the delay time t1 described above also requires the reference clock of high frequency.

An objective of this invention is eliminating the need for the coils to reduce the number of external parts so that the cost is reduced. Another objective of this invention is offering a water meter and more generally a fluid flow rate measuring device that requires neither the smoothing capacitor 14 of large capacitance nor the high frequency reference clock by suppressing the spike current.

SUMMARY OF THE INVENTION

A fluid flow rate measuring device of this invention has a first circular plate comprising a fan-shaped common capacitor electrode disposed on a principal of the first circular plate surface and an insulator portion disposed on the rest of the principal surface, a rotation device rotating the first circular plate at a rotation speed proportional to a flow rate of a fluid, a second circular plate superposed above the principal surface of the first circular plate with a certain space therebetween and comprising a first, a second and a third fan-shaped capacitor electrodes disposed on a principal surface of the second circular plate point-symmetrically with respect to a center of its principal surface, and a rotation detection unit detecting a capacitance of each of first, second and third capacitors each formed between the common capacitor electrode and each of the first, second and third capacitor electrodes, respectively.

A water meter of this invention has a first circular plate comprising a fan-shaped common capacitor electrode disposed on a principal of the first circular plate surface and an insulator portion disposed on the rest of the principal surface, a rotation device rotating the first circular plate at a rotation speed proportional to a flow rate of water, a second circular plate superposed above the principal surface of the first circular plate with a certain space therebetween and comprising a first, a second and a third fan-shaped capacitor electrodes disposed on a principal surface of the second circular plate point-symmetrically with respect to a center of its principal surface, and a rotation detection unit detecting a capacitance of each of first, second and third capacitors each formed between the common capacitor electrode and each of the first, second and third capacitor electrodes, respectively.

BRIEF DESCRIPTION OF THE DRAWINGS

FIG. 3 is a circuit diagram of a rotation detection unit in the water meter according to the first embodiment of this invention.

FIG. 7 is an operational waveform diagram of the rotation detection unit.

DETAILED DESCRIPTION OF THE INVENTION

[First Embodiment]
[Overall Structure of Water Meter]

Figure 1:
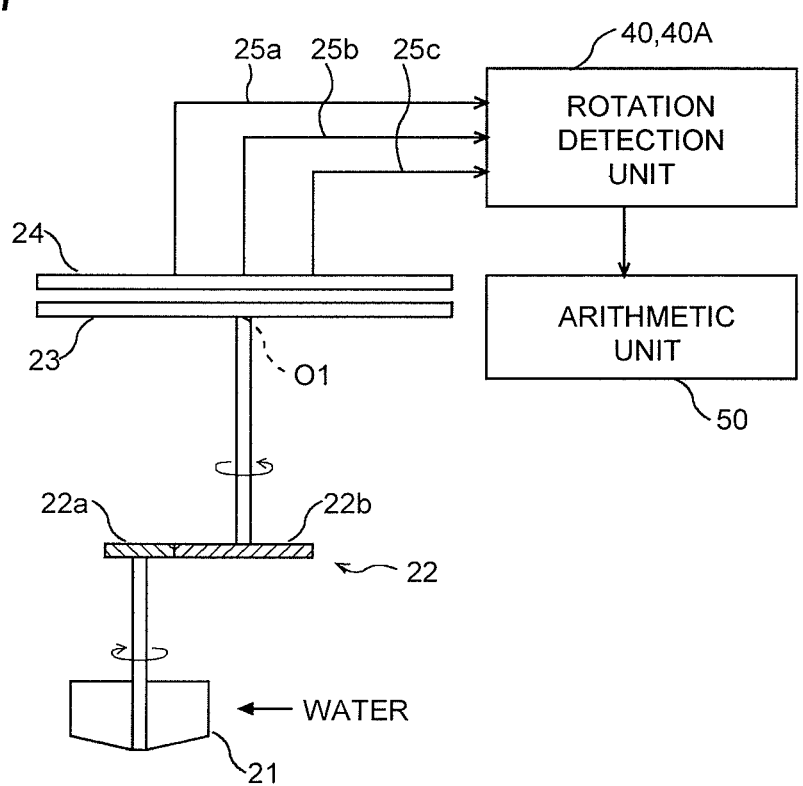
FIG. 1 shows a structure of a water meter according to a first embodiment of this invention.
Figure 2A:
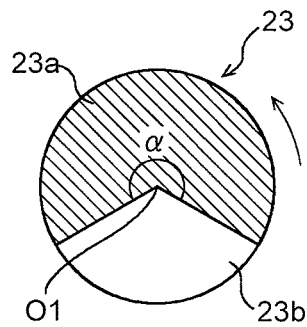
FIGS. 2A, 2B and 2C show structures of first and second circular plates.
Figure 2B:
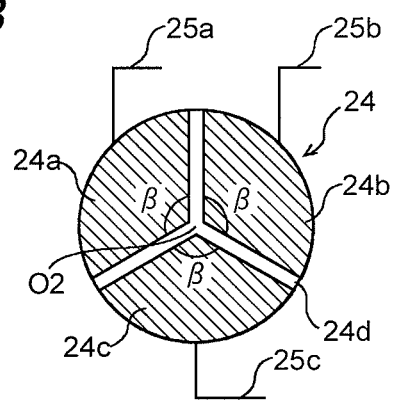
Figure 2C:
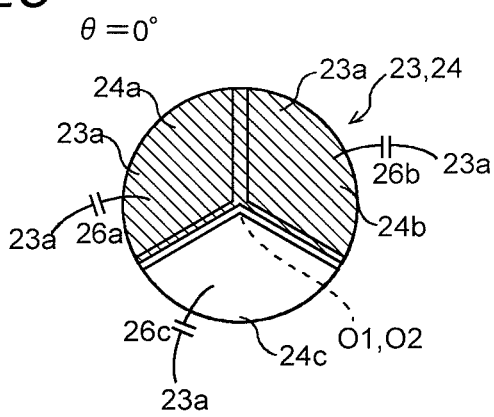

FIG. 1 shows a structure of a water meter according to a first embodiment of this invention. FIGS. 2A, 2B and 2C are plan views showing a first circular plate 23 and a second circular plate 24. The water meter is formed to include an impeller 21, a rotation reduction unit 22, the first circular plate 23, the second circular plate 24, a rotation detection unit 40 and an arithmetic unit 50.

The impeller 21 is placed in a water pipe and rotates at a rotation speed proportional to a flow rate (an amount of water flowing through the water pipe per unit time) of the water. The rotation speed of the impeller 21 is reduced by the rotation reduction unit 22 and transferred to a rotating shaft running through a center O1 of the first circular plate 23. The rotation reduction unit 22 is formed including a small gear 22a having a small number of teeth and a large gear 22b having a large number of teeth and meshing with the small gear 22a. Its reduction rate is determined by a ratio between the number of teeth of the small gear 22a and the number of teeth of the large gear 22b. The number of gears included in the rotation reduction unit 22 and the number of teeth of each of the gears may be increased or decreased in accordance with the reduction rate required. As a result, the first circular plate 23 rotates at a rotation speed (one rotation per second, for example) that is significantly smaller than the rotation speed of the impeller 21. A second circular plate 24 is firmly placed so as to superpose above the first circular plate 23 with a certain space between them. There is a layer of gas such as air between the first circular plate 23 and the second circular plate 24. While the first circular plate 23 is rotatable, the second circular plate 24 is configured so as not to rotate.

The first circular plate 23 is composed of a fan-shaped common capacitor electrode 23a (made of copper, for example) disposed on its principal surface and a fan-shaped insulator portion 23b (made of resin, for example) disposed on the rest of the principal surface excluding the common capacitor electrode 23a, as shown in FIG. 2A. A center angle α of the common capacitor electrode 23a is 240° while a center angle of the insulator portion 23b is 120°.

The second circular plate 24 is provided with fan-shaped first, second and third capacitor electrodes 24a, 24b and 24c disposed on its principal surface point-symmetrically with respect to a center O2 of the principal surface, as shown in FIG. 2B. The first, second and third capacitor electrodes 24a, 24b and 24c are congruent with each other, and their center angle β is 120°. The first, second and third capacitor electrodes 24a, 24b and 24c are electrically isolated from each other with strips of insulator 24d disposed therebetween. Each of first, second and third wirings 25a, 25b and 25c is drawn out from corresponding each of the first, second and third capacitor electrodes 24a, 24b and 24c and connected to the rotation detection unit 40.

FIG. 2C shows a state in which the second circular plate 24 is superposed above the first circular plate 23. The first circular plate 23 and the second circular plate 24 have the same radius and their centers O1 and O2 coincide with each other on the plan view. The principal surface of the second circular plate 24 on which the first, second and third capacitor electrodes 24a, 24b and 24c are formed faces toward the principal surface of the first circular plate 23 on which the common capacitor electrode 23a is formed.

Each of first, second and third capacitors 26a, 26b and 26c is formed between each of the first, second and third capacitor electrodes 24a, 24b and 24c and the common capacitor electrode 23a, respectively. In the case shown in FIG. 2C, the first capacitor electrode 24a and the second capacitor electrode 24b are completely covered with the common capacitor electrode 23a while the third capacitor electrode 24c is not covered with the common capacitor electrode 23a at all. As a result, each of capacitances Ca and Cb of the first and second capacitors 26a and 26b takes a maximum value (denoted as "1", for example), while a capacitance Cc of the third capacitor 26c takes a negligibly small minimum value (denoted as "0", for example). The rotation angle θ of the first circular plate 23 in the state shown in FIG. 2C is taken as 0°.

When the first circular plate 23 rotates, there are caused changes in the capacitances Ca, Cb and Cc of the first, second and third capacitors 26a, 26b and 26c. The rotation detection unit 40 detects the changes in the capacitances Ca, Cb and Cc.

The arithmetic unit 50 is configured to electrically detect the rotation angle θ of the first circular plate 23 based on the changes in the capacitances Ca, Cb and Cc. By cyclically making the detection by the rotation detection unit 40, the arithmetic unit 50 can detect the change in the rotation angle θ over time, that is, the rotation speed and a direction of the rotation of the first circular plate 23.

In addition, the arithmetic unit 50 calculates the flow rate of the water based on the rotation speed of the first circular plate 23. That is, the arithmetic unit 50 can calculate the rotation speed of the impeller 21 from the reduction rate of the rotation reduction unit 22. The arithmetic unit 50 also calculates the flow rate of the water from known correlation between the rotation speed of the impeller 21 and the flow rate of the water. The arithmetic unit 50 is a microcomputer, for example.

[Structure of Rotation Detection Unit 40]

FIG. 3 is a circuit diagram of the rotation detection unit 40. The rotation detection unit 40 is structured to include first, second and third grounding transistors 27a, 27b and 27c made of N-channel type MOS transistors, first, second and third transmission gates TGa, TGb and TGc, a resistor 28, a Schmitt inverter 29, an AND circuit 30, a counter 31, first, second and third latch circuits 32a, 32b and 32c, first, second and third inverters 33a, 33b and 33c and a common wiring 34.

Each of the first, second and third grounding transistors 27a, 27b and 27c is connected between each of the first, second and third wirings 25a, 25b and 25c and the ground, respectively. Each of the first, second and third transmission gates TGa, TGb and TGc is connected between each of the first, second and third wirings 25a, 25b and 25c and the common wiring 34, respectively.

Turning on/off of a switching circuit composed of six switching devices that are the first, second and third transmission gates TGa, TGb and TGc and the first, second and third grounding transistors 27a, 27b and 27c is controlled by first, second and third trigger signals Ta, Tb and Tc. The switching circuit has switching states denoted as first, second and third modes, as shown in Table 1.

TABLE 1

|  | TGa | TGb | TGc | 27a | 27b | 27c |
|---|---|---|---|---|---|---|
| First Mode | ON | OFF | OFF | OFF | ON | ON |
| Second Mode | OFF | ON | OFF | ON | OFF | ON |
| Third Mode | OFF | OFF | ON | ON | ON | OFF |

(a) In the first mode, the first, second and third trigger signals Ta, Tb and Tc are (H, L, L). Thus only the first transmission gate TGa and the second and third grounding transistors 27b and 27c are turned on. "H" represents the H level (power supply voltage VDD), while "L" represents the L level (ground voltage 0 V).

Figure 4A:
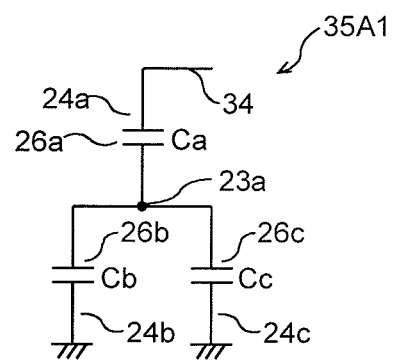
FIGS. 4A, 4B and 4C show combination capacitors in the water meter according to the first embodiment of this invention.

As a result, there is formed a first combination capacitor 35A1 as shown in FIG. 4A. The first combination capacitor 35A1 is formed by serially connecting the first capacitor 26a through the common capacitor electrode 23a with the second and third capacitors 26b and 26c that are connected in parallel. The first capacitor electrode 24a of the first capacitor 26a is connected to an input terminal of the Schmitt inverter 29 through the common wiring 34. The second and third capacitor electrodes 24b and 24c are grounded.

A capacitance CA1 of the first combination capacitor 35A1 is represented by Equation (3).

$$CA1 = Ca \cdot (Cb+Cc)/(Ca+Cb+Cc) \quad (3)$$

Figure 4B:
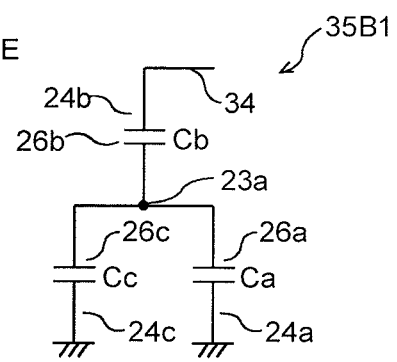

(b) In the second mode, the first, second and third trigger signals Ta, Tb and Tc are (L, H, L). Thus only the second transmission gate TGb and the first and third grounding transistors 27a and 27c are turned on. As a result, there is formed a second combination capacitor 35B1 as shown in FIG. 4B. The second combination capacitor 35B1 is formed by serially connecting the second capacitor 26b through the common capacitor electrode 23a with the first and third capacitors 26a and 26c that are connected in parallel. The second capacitor electrode 24b of the second capacitor 26b is connected to the input terminal of the Schmitt inverter 29 through the common wiring 34. The first and third capacitor electrodes 24a and 24c are grounded. A capacitance CB1 of the second combination capacitor 35B1 is represented by Equation (4).

$$CB1 = Cb \cdot (Ca+Cc)/(Ca+Cb+Cc) \quad (4)$$

Figure 4C:
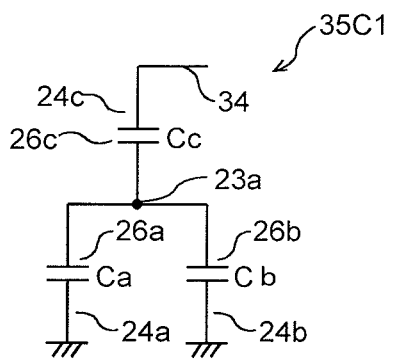

(c) In the third mode, the first, second and third trigger signals Ta, Tb and Tc are (L, L, H). Thus only the third transmission gate TGc and the first and second grounding transistors 27a and 27b are turned on. As a result, there is formed a third combination capacitor 35C1 as shown in FIG. 4C. The third combination capacitor 35C1 is formed by serially connecting the third capacitor 26c through the common capacitor electrode 23a with the first and second capacitors 26a and 26b that are connected in parallel. The third capacitor electrode 24c of the third capacitor 26c is connected to the input terminal of the Schmitt inverter 29 through the common wiring 34. The first and second capacitor electrodes 24a and 24b are grounded. A capacitance CC1 of the third combination capacitor 35C1 is represented by Equation (5).

$$CC1 = Cc \cdot (Ca+Cb)/(Ca+Cb+Cc) \quad (5)$$

Figure 5A:
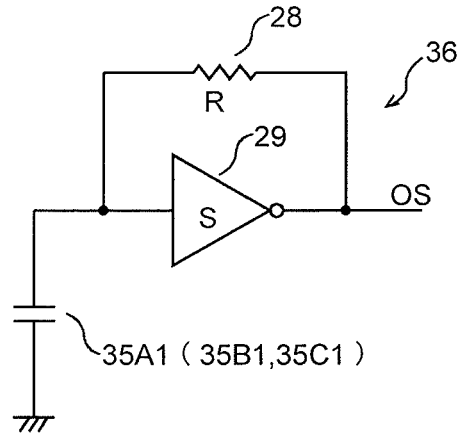
FIG. 5A and FIG. 5B are circuit diagrams of an RC oscillation circuit.

An RC oscillation circuit 36 is formed of the resistor 28, the Schmitt inverter 29 and each of the first, second and third combination capacitors 35A1, 35B1 and 35C1 corresponding to each of the first, second and third modes, respectively, as shown in FIG. 5A. The capacitor constituting the RC oscillation circuit 36 is the first combination capacitor 35A1 in the first mode, the second combination capacitor 35B1 in the second mode, and the third combination capacitor 35C1 in the third mode. The resistor 28 is connected between the input terminal and an output terminal of the Schmitt inverter 29.

The Schmitt inverter 29 has a first threshold voltage VTL and a second threshold voltage VTH. The first threshold voltage VTL and the second threshold voltage VTH are set between VDD that is the power supply voltage to the Schmitt inverter and the ground voltage. The second threshold voltage VTH is larger than the first threshold voltage VTL.

Figure 6:
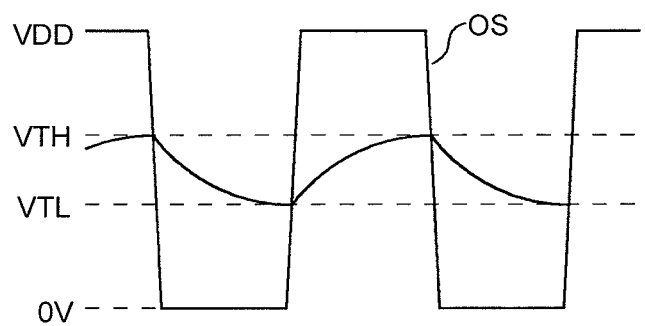
FIG. 6 is an operational waveform diagram of the RC oscillation circuit.

FIG. 6 is an oscillation waveform diagram of the RC oscillation circuit 36. The waveform at the input terminal of the Schmitt inverter 29 varies in a range between the first threshold voltage VTL and the second threshold voltage VTH. An oscillation signal OS is obtained from the output terminal of the Schmitt inverter 29.

An oscillation frequency FRC of the RC oscillation circuit 36 is represented by Equation (6).

$$FRC = 1 \bigg/ \bigg\{ R \cdot C0 \cdot \log_e \bigg[ \frac{(VDD-VTL)}{(VDD-VTH)} \cdot \frac{VTH}{VTL} \bigg] \bigg\} \quad (6)$$

where C0 is CA1 in the first mode, CB1 in the second mode and CC1 in the third mode. That is, the oscillation frequency FRC of the RC oscillation circuit 36 is inversely proportional to each of the capacitances CA1, CB1 and CC1 of the first, second and third combination capacitors 35A1, 35B1 and 35C1.

Although a parasitic capacitance CX existing between the first, second and third capacitor electrodes 24a, 24b and 24c is connected in parallel with each of the first, second and third combination capacitors 35A1, 35B1 and 35C1 in each of the modes, respectively, the parasitic capacitance CX is not taken into consideration in Equation (6). To take the parasitic capacitance CX into consideration, C0 is replaced with C0+CX in Equation (6).

Figure 5B:
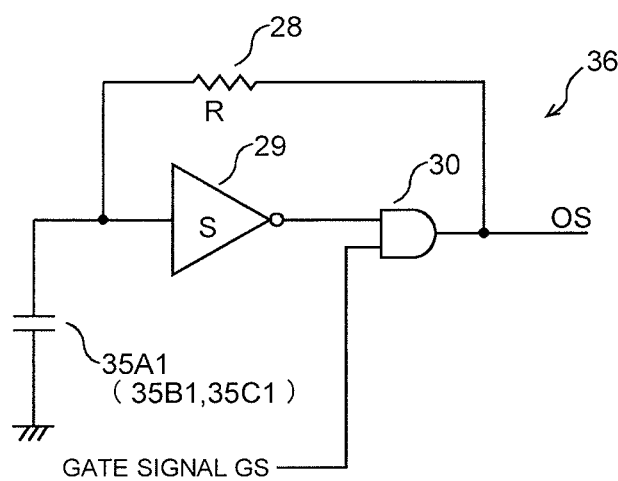

The oscillation signal OS of the RC oscillation circuit 36 is inputted to the counter 31 through the AND circuit 30. The oscillation signal OS is inputted for a period during which a gate signal GS is at the H level. The gate signal GS becomes the H level when any of the first, second and third trigger signals Ta, Tb and Tc is at the H level. The counter 31 counts a number of pulses of the oscillation signal OS during the period. That is, the AND circuit 30 and the counter 31 serve as a frequency counter to count the oscillation frequency of the RC oscillation circuit 36. Alternatively, the resistor 28 in the RC oscillation circuit 36 can be connected between the input terminal of the Schmitt inverter 29 and an output terminal of the AND circuit 30 as shown in FIG. 5B The counter 31 operates based on a clock of about 32 KHz. The counter 31 is configured so as to be reset by a reset signal RS just before any of the first, second and third trigger pulses Ta, Tb and Tc becomes the H level, that is, just before the RC oscillation circuit 36 starts the operation.

The first latch circuit 32a latches a number counted by the counter 31 in response to a first latch pulse generated in synchronization with a falling edge of the first trigger signal Ta. The second latch circuit 32b latches a number counted by the counter 31 in response to a second latch pulse generated in synchronization with a falling edge of the second trigger signal Tb. The third latch circuit 32c latches a number counted by the counter 31 in response to a third latch pulse generated in synchronization with a falling edge of the third trigger signal Tc.

As described above, the rotation detection unit 40 detects the capacitances CA1, CB1 and CC1 of the first, second and third combination capacitors 35A1, 35B1 and 35C1, which are converted into the oscillation frequencies FRC of the RC oscillation circuit 36.

The arithmetic unit 50 calculates the oscillation frequencies FRC of the RC oscillation circuit 36 in the first, second and third modes from the numbers counted by the counter 31 and latched in the first, second and third latch circuits 32a, 32b and 32c. The arithmetic unit 50 calculates the capacitances CA1, CB1 and CC1 of the first, second and third combination capacitors 35A1, 35B1 and 35C1 based on Equation (6).

Figure 10A:
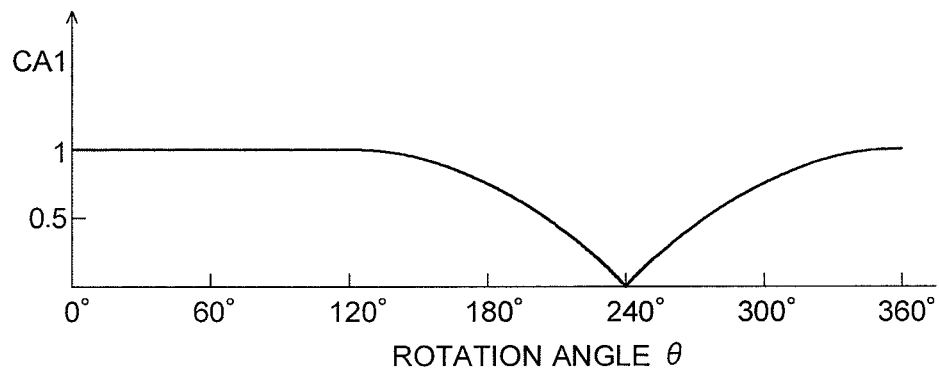
FIGS. 10A, 10B and 10C show the correlations of the capacitances of the combination capacitors with the rotation angle of the first circular plate in the water meter according to the first embodiment of this invention.
Figure 10B:
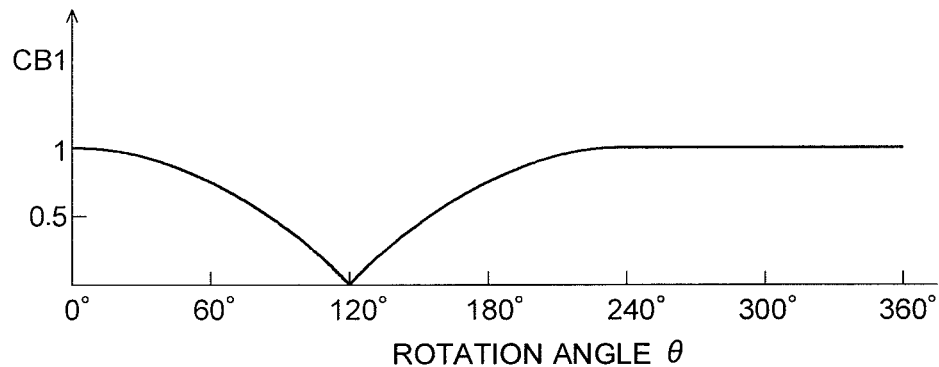
Figure 10C:
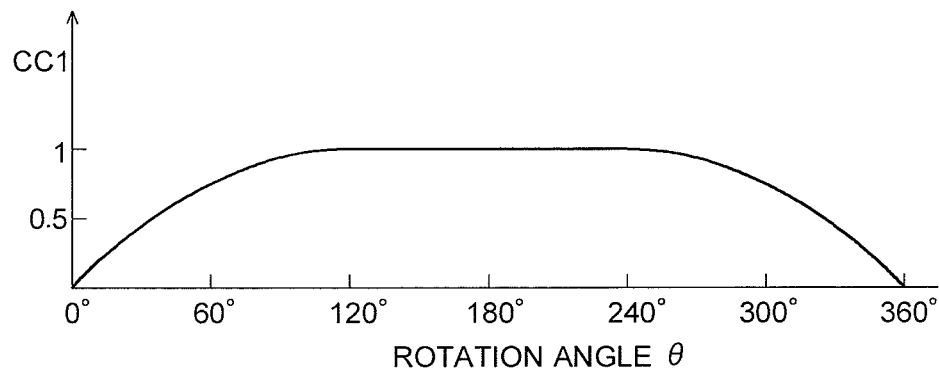

The arithmetic unit 50 also calculates the rotation angle θ of the first circular plate 23 from correlations of the capacitances CA1, CB1 and CC1 of the first, second and third combination capacitors 35A1, 35B1 and 35C1 with the rotation angle θ (Refer to FIGS. 10A, 10B and 10C.). By cyclically performing the operation of the rotation detection unit 40, the arithmetic unit 50 can detect the change in the rotation angle θ over time, that is, the rotation speed and the direction of the rotation of the first circular plate 23.

[Operation of Rotation Detection Unit 40]

Next, operations of the rotation detection unit 40 are explained referring to FIG. 7. First, the first trigger signal Ta rises to the H level. The first combination capacitor 35A1 in the first mode is selected in a period during which the first trigger signal Ta is at the H level. Then the RC oscillation circuit 36 starts the oscillation based on the first combination capacitor 35A1. The counter 31 is reset just before the first trigger signal Ta rises to the H level, and counts the oscillation frequency of the RC oscillation circuit 36. The number in the counter 31 is latched by the first latch circuit 32a.

Next, the first trigger signal Ta falls to the L level, and the second trigger signal Tb rises to the H level thereafter. The second combination capacitor 35B1 in the second mode is selected in a period during which the second trigger signal Tb is at the H level. Then the RC oscillation circuit 36 starts the oscillation based on the second combination capacitor 35B1. The counter 31 is reset just before the second trigger signal Tb rises to the H level, and counts the oscillation frequency of the RC oscillation circuit 36. The number in the counter 31 is latched by the second latch circuit 32b.

Next, the second trigger signal Tb falls to the L level, and the third trigger signal Tc rises to the H level thereafter. The third combination capacitor 35C1 in the third mode is selected in a period during which the third trigger signal Tc is at the H level. Then the RC oscillation circuit 36 starts the oscillation based on the third combination capacitor 35C1. The counter 31 is reset just before the third trigger signal Tc rises to the H level, and counts the oscillation frequency of the RC oscillation circuit 36. The number in the counter 31 is latched by the third latch circuit 32c.

[Regarding Rotation Angle θ of First Circular Plate 23]

The correlations of the capacitances CA1, CB1 and CC1 of the first, second and third combination capacitors 35A1, 35B1 and 35C1 with the rotation angle θ of the first circular plate 23 are explained referring to FIGS. 8A-10C and Table 2.

TABLE 2

|     | 0°  | 60°  | 120° | 180° | 240° | 300° | 360° |
| --- | --- | ---- | ---- | ---- | ---- | ---- | ---- |
| Ca  | 1   | 1    | 1    | 0.5  | 0    | 0.5  | 1    |
| Cb  | 1   | 0.5  | 0    | 0.5  | 1    | 1    | 1    |
| Cc  | 0   | 0.5  | 1    | 1    | 1    | 0.5  | 0    |
| CA1 | 1   | 1    | 1    | 0.75 | 0    | 0.75 | 1    |
| CB1 | 1   | 0.75 | 0    | 0.75 | 1    | 1    | 1    |
| CC1 | 0   | 0.75 | 1    | 1    | 1    | 0.75 | 0    |

Figure 8A:
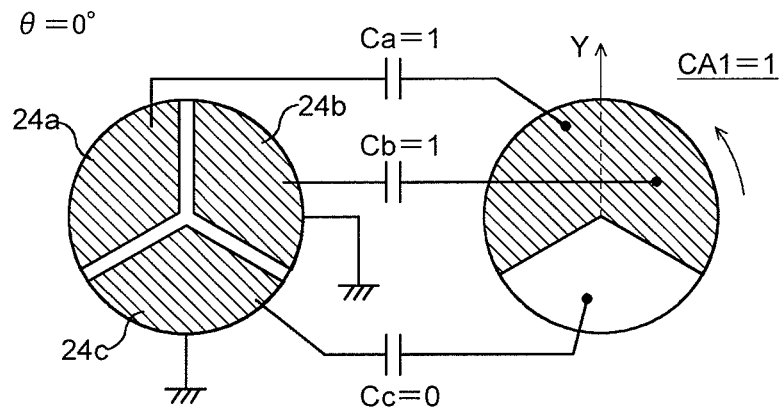
FIGS. 8A, 8B and 8C show correlations of capacitances of the combination capacitors with a rotation angle of the first circular plate in the water meter according to the first embodiment of this invention.

FIGS. 8A-9C are to explain the correlation between the capacitance CA1 of the first combination capacitor 35A1 and the rotation angle θ of the first circular plate 23. When θ=0°, Ca=1, Cb=1 and Cc=0, as shown in FIG. 8A. Each of Ca, Cb and Cc is the capacitance of each of the first, second and third capacitors 26a, 26b and 26c respectively, and its maximum value is denoted as "1". In this case, CA1=1 from Equation (3). Note that CA1 is normalized so that its maximum value is "1".

Figure 8B:
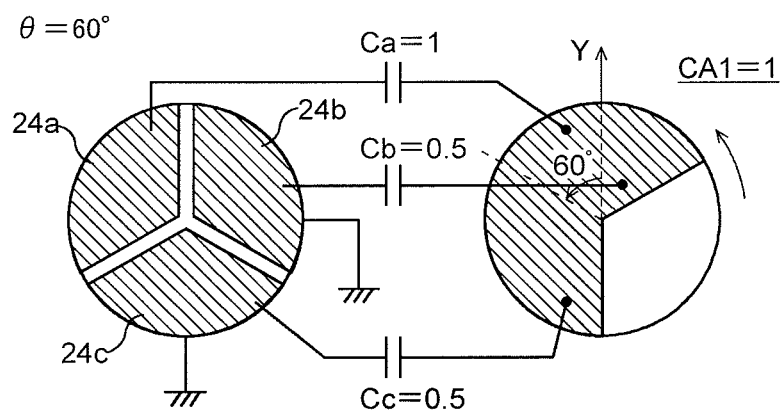
Figure 8C:
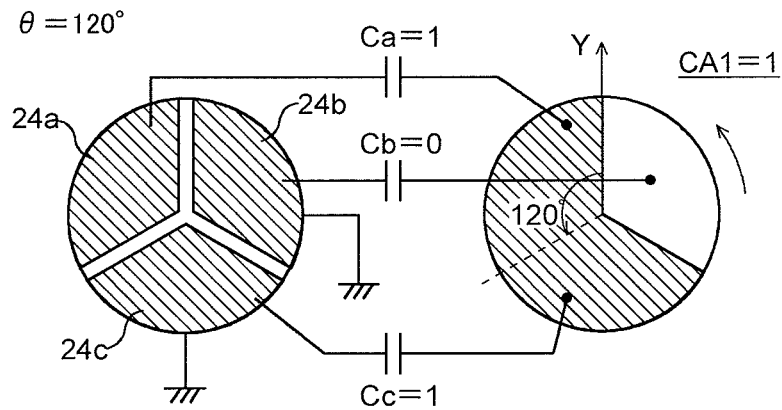

When θ=60°, Ca=1, Cb=0.5 and Cc=0.5, as shown in FIG. 8B. In this case also, CA1=1. When θ=120°, Ca=1, Cb=0 and Cc=1, as shown in FIG. 8C. In this case also, CA1=1. That is, CA=1 in the cases where θ=0°-120°

Figure 9A:
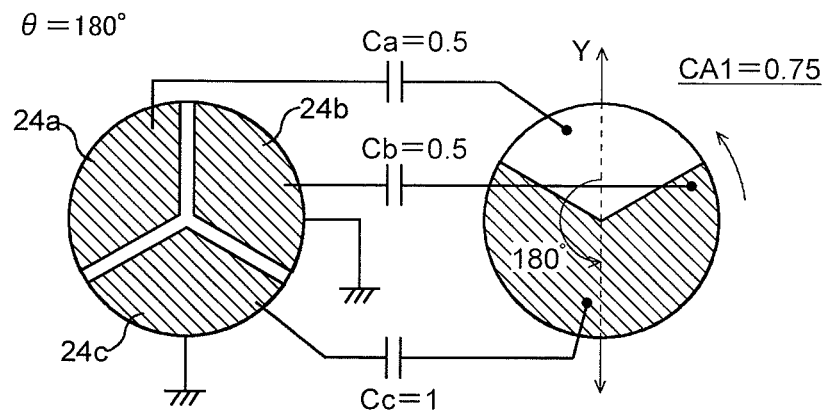
FIGS. 9A, 9B and 9C show the correlations of the capacitances of the combination capacitors with the rotation angle of the first circular plate in the water meter according to the first embodiment of this invention.
Figure 9B:
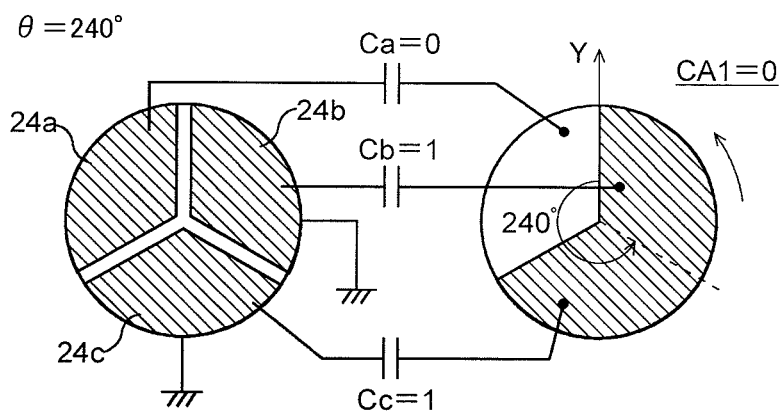
Figure 9C:
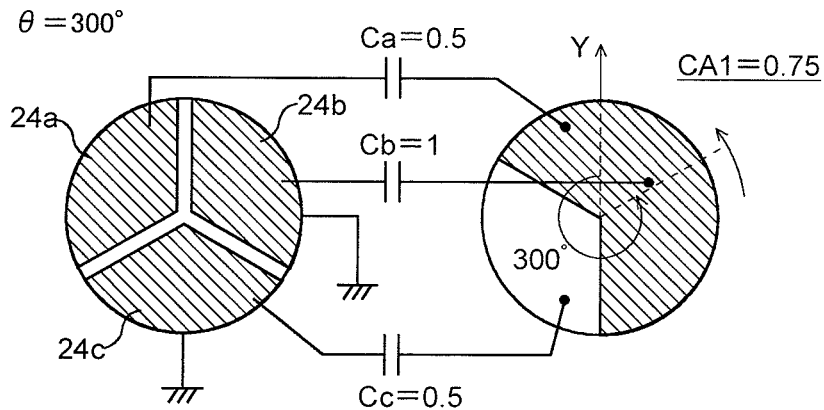

When θ=180°, Ca=0.5, Cb=0.5 and Cc=1, as shown in FIG. 9A, thus CA1=0.75. That is, CA1 decreases from "1" in the case where θ=120° to "0.75". When θ=240°, Ca=0, Cb=1 and Cc=1, as shown in FIG. 9B, thus CA1=0. When θ=300°, Ca=0.5, Cb=1 and Cc=0.5, as shown in FIG. 9C, thus CA1=0.75.

From what is described above, the correlation between CA1 and the rotation angle θ of the first circular plate 23 is derived as shown in FIG. 10A. Similarly, the correlation between each of CB1 and CC1 and the rotation angles θ of the first circular plate 23 is derived as shown in each of FIGS. 10B and 10C, respectively. CB1 is shifted 120° in phase from CA1. CC1 is shifted 240° in phase from CA1.

Therefore, the arithmetic unit 50 can detect the rotation angle θ of the first circular plate 23 from the correlations of the capacitances CA1, CB1 and CC1 of the first, second and third combination capacitors 35A1, 35B1 and 35C1 with the rotation angle θ of the first circular plate 23.

[Second Embodiment]

Figure 11:
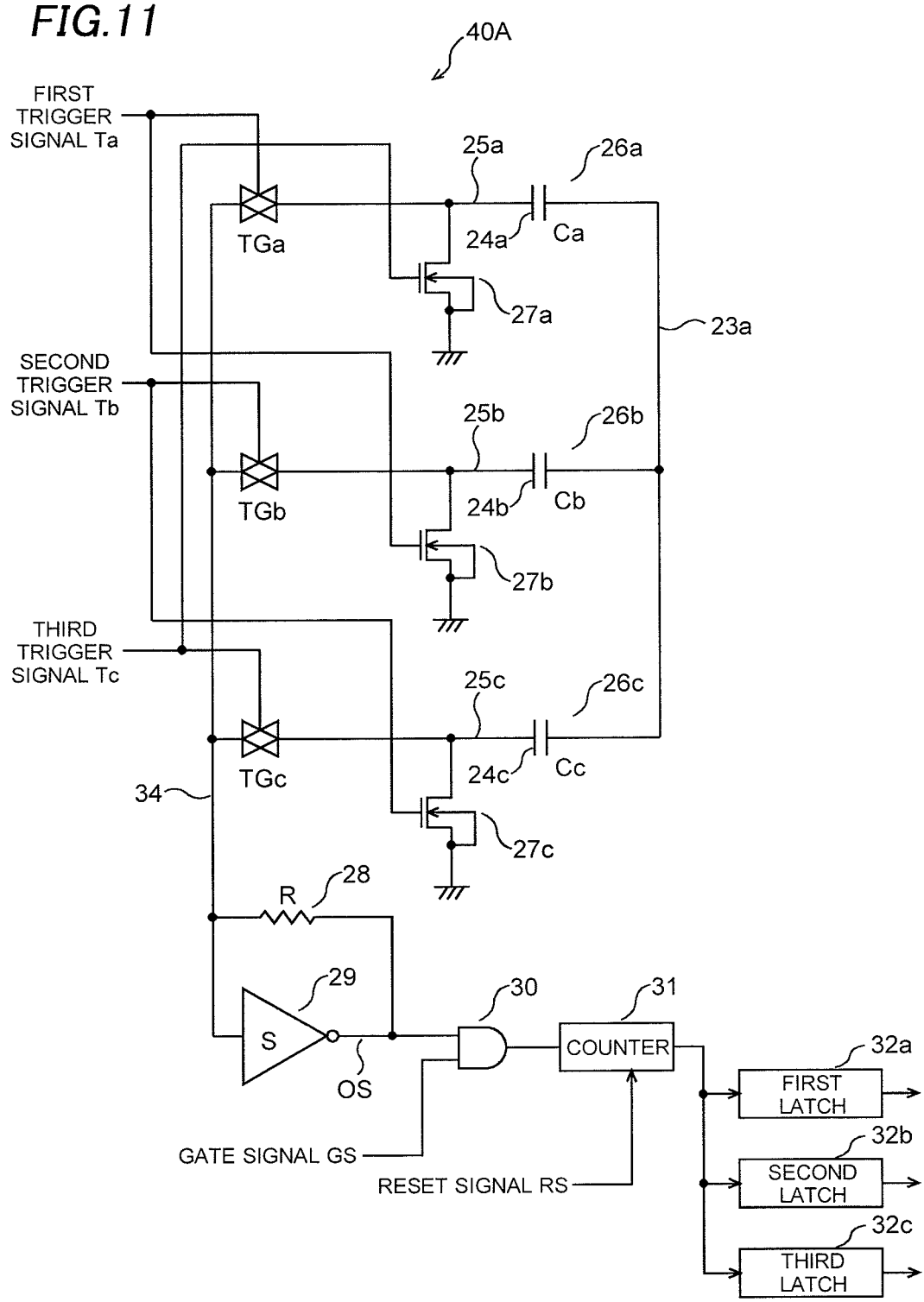
FIG. 11 is a circuit diagram of a rotation detection unit in a water meter according to a second embodiment of this invention.
Figure 12A:
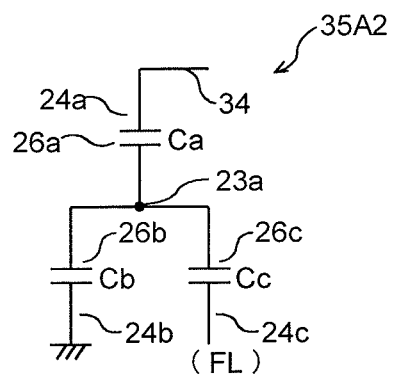
FIGS. 12A, 12B and 12C show combination capacitors in the water meter according to the second embodiment of this invention.
Figure 12B:
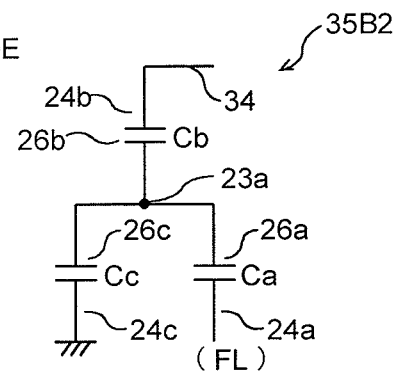
Figure 12C:
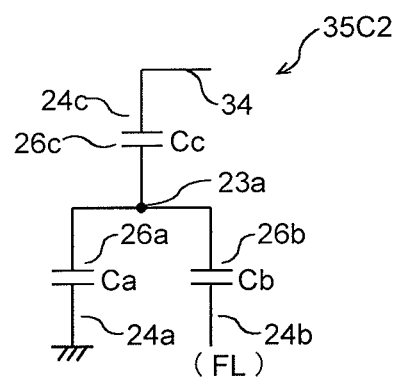

A rotation detection unit 40A in a water meter according to a second embodiment is formed by modifying the structure of the switching circuit in the water meter according to the first embodiment. Other structures are the same as those in the water meter according to the first embodiment. FIG. 11 is a circuit diagram of the rotation detection unit 40A. FIGS. 12A, 12B and 12C are circuit diagrams of first, second and third combination capacitors 35A2, 35B2 and 35C2. A switching circuit in the rotation detection unit 40A has switching states denoted as first, second and third modes, as shown in Table 3.

TABLE 3

|  | TGa | TGb | TGc | 27a | 27b | 27c |
|---|---|---|---|---|---|---|
| First Mode | ON | OFF | OFF | OFF | ON | OFF |
| Second Mode | OFF | ON | OFF | OFF | OFF | ON |
| Third Mode | OFF | OFF | ON | ON | OFF | OFF |

(a) In the first mode, the first, second and third trigger signals Ta, Tb and Tc are (H, L, L). Thus only the first transmission gate TGa and the second grounding transistor 27b are turned on.

As a result, there is formed the first combination capacitor 35A2 as shown in FIG. 12A. The first combination capacitor 35A2 is formed by serially connecting the first capacitor 26a to the second capacitor 26b through the common capacitor electrode 23a. The first capacitor electrode 24a of the first capacitor 26a is connected to the input terminal of the Schmitt inverter 29 through the common wiring 34. While the second capacitor electrode 24b is grounded, the third capacitor electrode 24c is in a floating state, thus Cc=0.

Therefore, a capacitance CA2 of the first combination capacitor 35A2 is represented by Equation (7).

$$CA2 = Ca \cdot Cb/(Ca+Cb) \quad (7)$$

(b) In the second mode, the first, second and third trigger signals Ta, Tb and Tc are (L, H, L). Thus only the second transmission gate TGb and the third grounding transistor 27c are turned on. As a result, there is formed the second combination capacitor 35B2 as shown in FIG. 12B. The second combination capacitor 35B2 is formed by serially connecting the second capacitor 26b to the third capacitor 26c through the common capacitor electrode 23a. The second capacitor electrode 24b of the second capacitor 26b is connected to the input terminal of the Schmitt inverter 29 through the common wiring 34. While the third capacitor electrode 24c is grounded, the first capacitor electrode 24a is in the floating state, thus Ca=0.

A capacitance CB2 of the second combination capacitor 35B2 is represented by Equation (8).

$$CB2 = Cb \cdot Cc/(Cb+Cc) \quad (8)$$

(c) In the third mode, the first, second and third trigger signals Ta, Tb and Tc are (L, L, H). Thus only the third transmission gate TGc and the first grounding transistor 27a are turned on. As a result, there is formed the third combination capacitor 35C2 as shown in FIG. 12C. The third combination capacitor 35C2 is formed by serially connecting the third capacitor 26c to the first capacitor 26a through the common capacitor electrode 23a. The third capacitor electrode 24c of the third capacitor 26c is connected to the input terminal of the Schmitt inverter 29 through the common wiring 34. While the first capacitor electrode 24a is grounded, the second capacitor electrode 24b is in the floating state, thus Cb=0. A capacitance CC2 of the third combination capacitor 35C2 is represented by Equation (9).

$$CC2 = Cc \cdot Ca/(Ca+Cc) \quad (9)$$

[Regarding Rotation Angle θ of First Circular Plate 23]

Figure 13A:
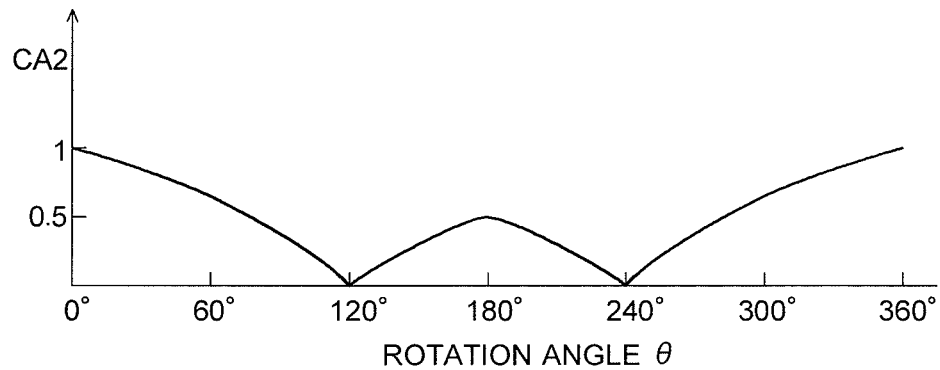
FIGS. 13A, 13B and 13C show correlations of capacitances of combination capacitors with a rotation angle of a first circular plate in the water meter according to the second embodiment of this invention.
Figure 13B:
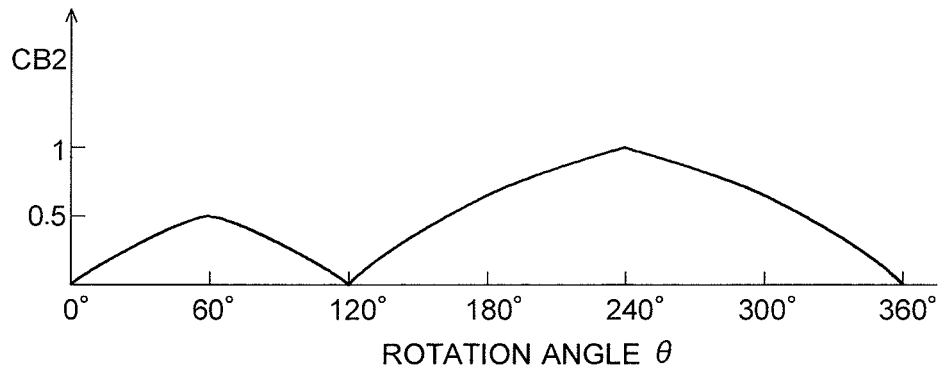
Figure 13C:
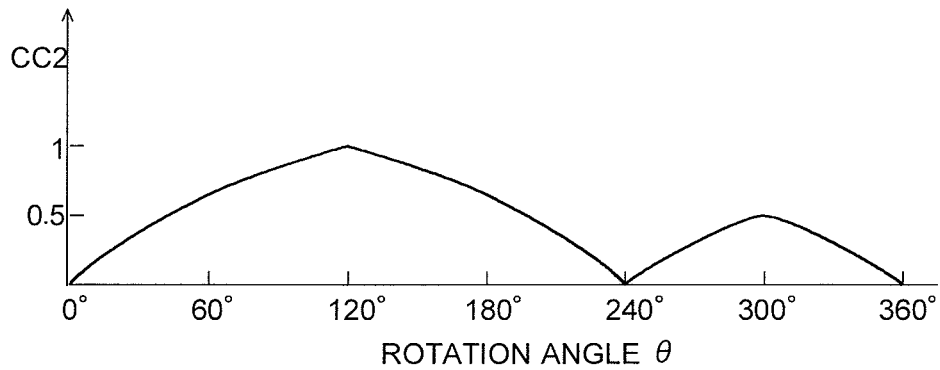
Figure 14:
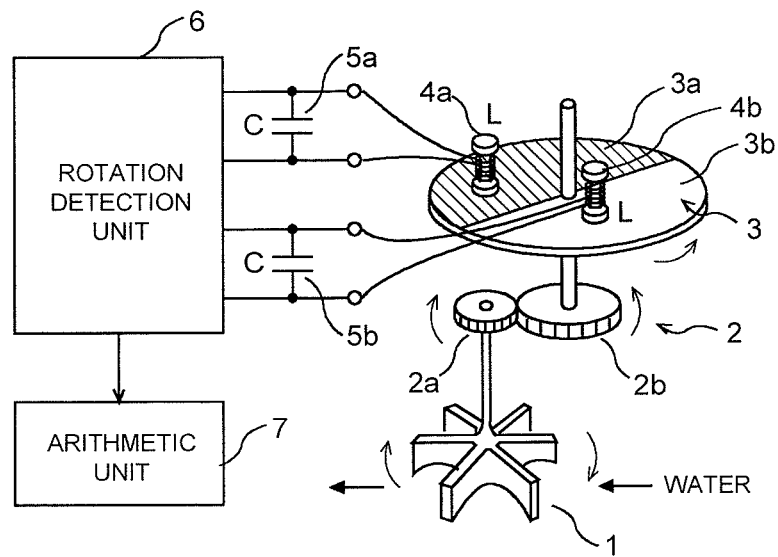
FIG. 14 shows a structure of a conventional water meter.
Figure 15:
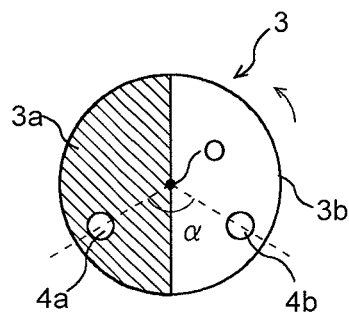
FIG. 15 is a plan view showing a structure of a circular plate.
Figure 16:
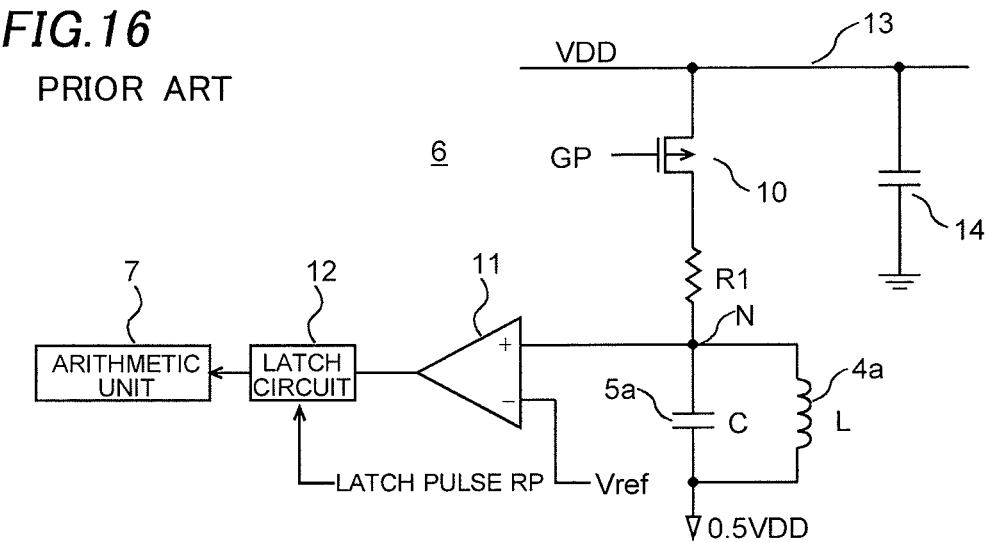
FIG. 16 is a circuit diagram of a rotation detection unit in the conventional water meter.
Figure 17:
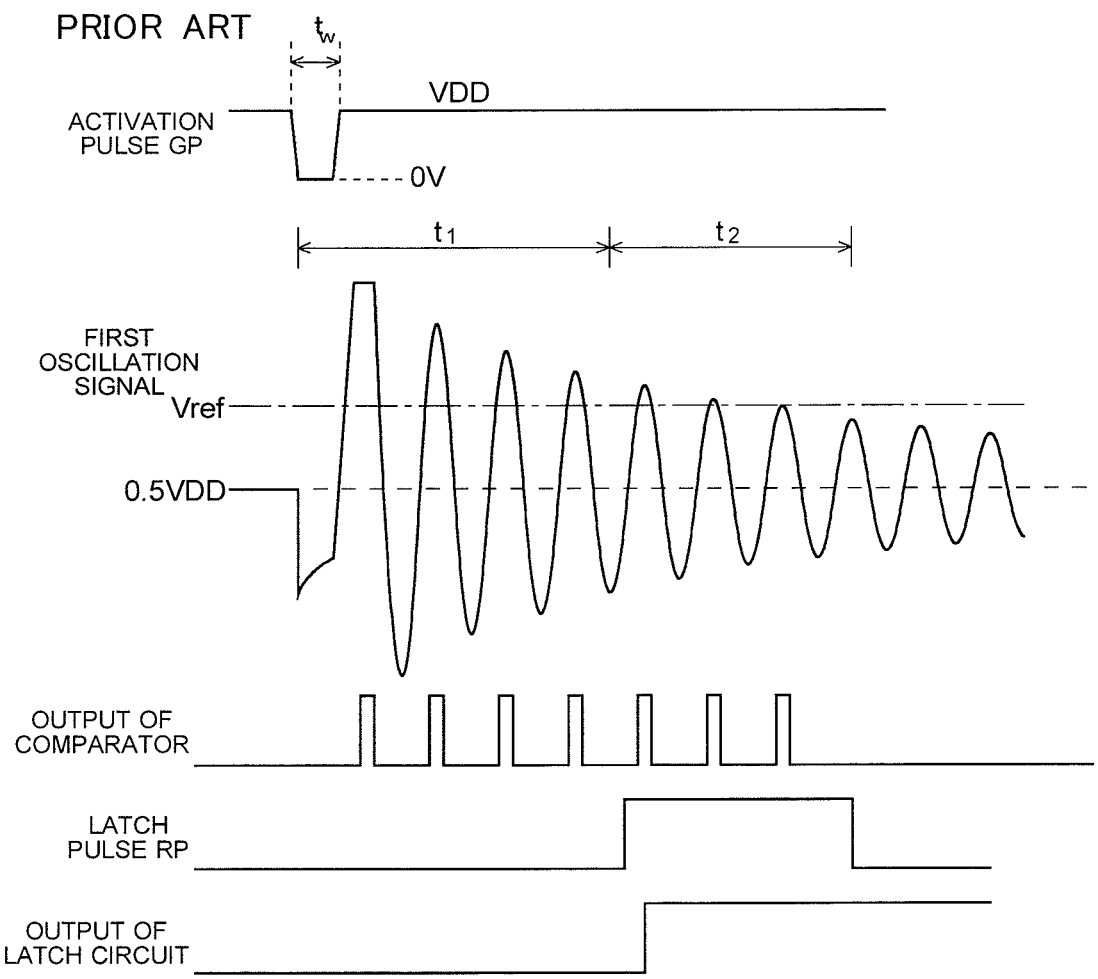
FIG. 17 is an operational waveform diagram of the rotation detection unit in the conventional water meter.
Figure 18A:
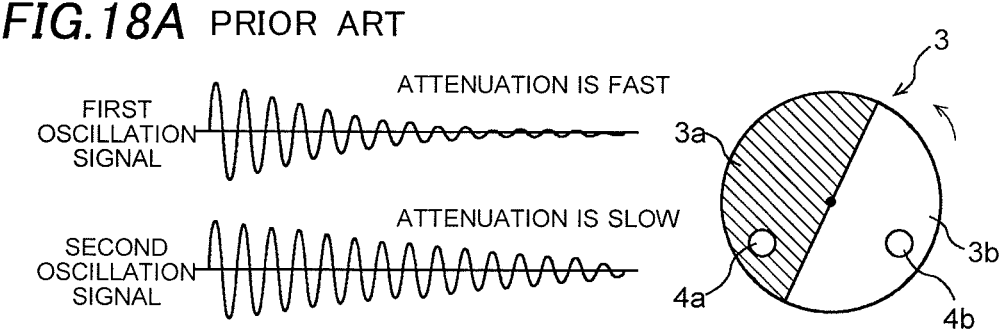
FIGS. 18A-18D show correlation between rotation states and oscillation signals in the conventional water meter.
Figure 18B:
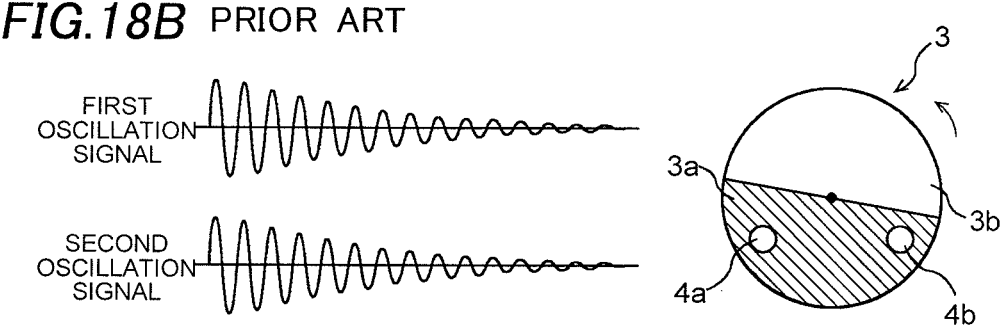
Figure 18C:
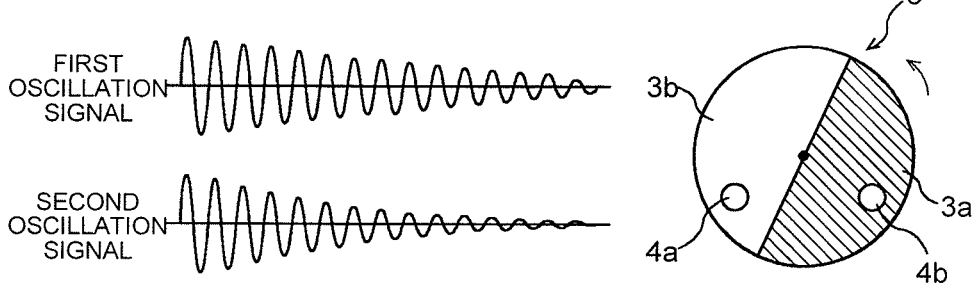
Figure 18D:
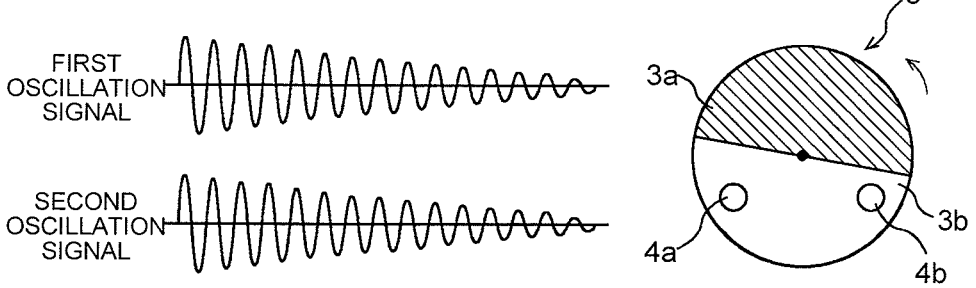
Figure 19:
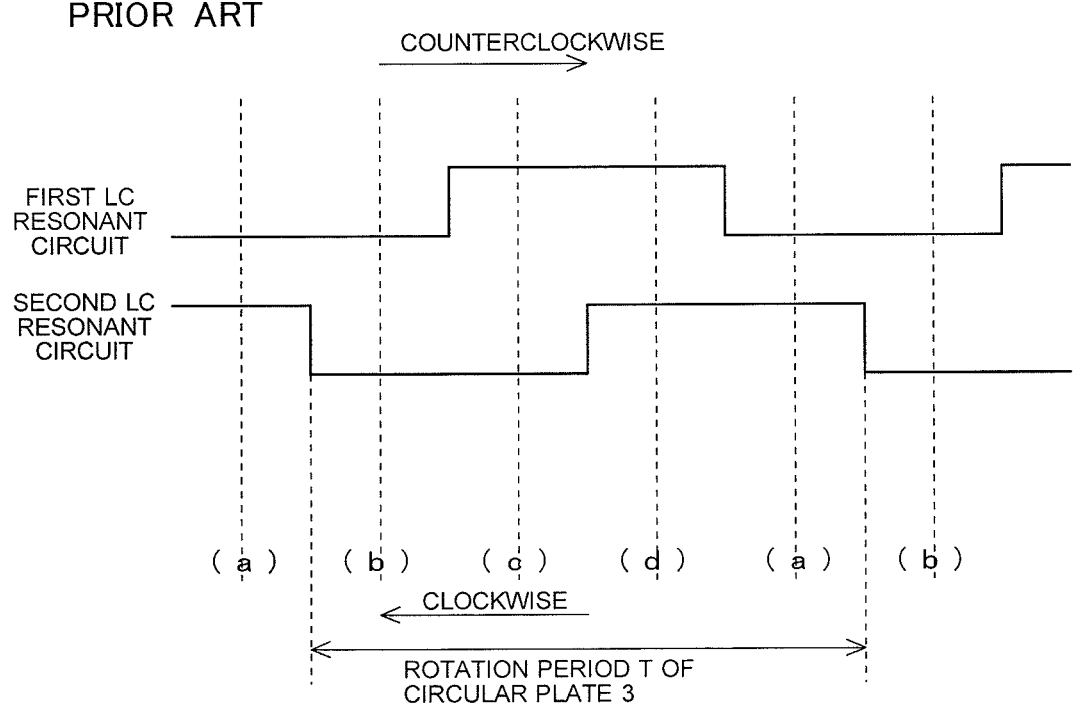
FIG. 19 shows correlations of the rotation states with data held in latch circuits in the rotation detection unit in the conventional water meter.

Correlations of the capacitances CA2, CB2 and CC2 of the first, second and third combination capacitors 35A2, 35B2 and 35C2 with the rotation angle θ of the first circular plate 23 are shown in Table 4 and FIGS. 13A, 13B and 13C. The correlations can be obtained through calculations similar to those described in the first embodiment.

TABLE 4

|  | 0° | 60° | 120° | 180° | 240° | 300° | 360° |
|---|---|---|---|---|---|---|---|
| Ca | 1 | 1 | 1 | 0.5 | 0 | 0.5 | 1 |
| Cb | 1 | 0.5 | 0 | 0.5 | 1 | 1 | 1 |
| Cc | 0 | 0.5 | 1 | 1 | 1 | 0.5 | 0 |
| CA2 | 1 | 0.67 | 0 | 0.5 | 0 | 0.67 | 1 |
| CB2 | 0 | 0.5 | 0 | 0.67 | 1 | 0.67 | 0 |
| CC2 | 0 | 0.67 | 1 | 0.67 | 0 | 0.5 | 0 |

The arithmetic unit 50 calculates the oscillation frequencies FRC of the RC oscillation circuit 36 in the first, second and third modes from the numbers counted by the counter 31 and latched in the first, second and third latch circuits 32a, 32b and 32c in the same way as described in the first embodiment. The arithmetic unit 50 calculates the capacitances CA2, CB2 and CC2 of the first, second and third combination capacitors 35A2, 35B2 and 35C2 based on Equation (6).

The arithmetic unit 50 also calculates the rotation angle θ of the first circular plate 23 from the correlations of the capacitances CA2, CB2 and CC2 of the first, second and third combination capacitors 35A2, 35B2 and 35C2 with the rotation angle θ (Refer to FIGS. 13A, 13B and 13C.). By cyclically performing the operation of the rotation detection unit 40A, the arithmetic unit 50 can detect the change in the rotation angle θ over time, that is, the rotation speed and the direction of the rotation of the first circular plate 23.

The first and second embodiments are related to the water meter. However, the scope of this invention is not limited to the water meter, and may be widely applied to a device for measuring a flow rate of liquid other than water or flow rate of gas as long as it measures the flow rate of the fluid basically by detecting a rotation speed of a circular plate that rotates at a rotation speed proportional to the flow rate of the fluid.

Since the fluid flow rate measuring device and the water meter of this invention require no coil, its cost can be reduced and no abnormal operation is caused even when a permanent magnet is brought close to it.

In addition, there is no need for the smoothing capacitor of large capacitance with the fluid flow rate measuring device of this invention because no spike current flows when it is activated. Furthermore, the circuit structure can be simplified because it does not require the reference clock of high frequency. While the fluid flow rate measuring device of this invention is suitable for the water meter, it may be applied to a flow rate measuring device for a liquid other than water or gas.

What is claimed is:

1. A fluid flow rate measuring device comprising:
   a first circular plate comprising a fan-shaped common capacitor electrode disposed on a principal of the first circular plate surface and an insulator portion disposed on the rest of the principal surface;
   a rotation device rotating the first circular plate at a rotation speed proportional to a flow rate of a fluid;
   a second circular plate superposed above the principal surface of the first circular plate with a certain space therebetween and comprising a first, a second and a third fan-shaped capacitor electrodes disposed on a principal surface of the second circular plate point-symmetrically with respect to a center of its principal surface; and
   a rotation detection unit detecting a capacitance of each of first, second and third capacitors each formed between the common capacitor electrode and each of the first, second and third capacitor electrodes, respectively.

2. The fluid flow rate measuring device of claim 1, wherein the rotation detection unit comprises a switching circuit, an oscillation circuit and a frequency counter, the switching circuit forming a combination capacitor by connecting the first, second and third capacitors, the oscillation circuit comprising the combination capacitor and its oscillation frequency being modified in accordance with a capacitance of the combination capacitor, the frequency counter counting the oscillation frequency of the oscillation circuit.

3. The fluid flow rate measuring device of claim 2, wherein the switching circuit forms a first combination capacitor by grounding the second and third capacitor electrodes and connecting the first capacitor electrode to an input terminal of the oscillation circuit in response to a first trigger signal, forms a second combination capacitor by grounding the first and third capacitor electrodes and connecting the second capacitor electrode to the input terminal of the oscillation circuit in response to a second trigger signal, and forms a third combination capacitor by grounding the first and second capacitor electrodes and connecting the third capacitor electrode to the input terminal of the oscillation circuit in response to a third trigger signal.

4. The fluid flow rate measuring device of claim 2, wherein the switching circuit forms a first combination capacitor by grounding the second capacitor electrode, putting the third capacitor electrode into a floating state and connecting the first capacitor electrode to an input terminal of the oscillation circuit in response to a first trigger signal, forms a second combination capacitor by grounding the third capacitor electrode, putting the first capacitor electrode into the floating state and connecting the second capacitor electrode to the input terminal of the oscillation circuit in response to a second trigger signal, and forms a third combination capacitor by grounding the first capacitor electrode, putting the second capacitor electrode into the floating state and connecting the third capacitor electrode to the input terminal of the oscillation circuit in response to a third trigger signal.

5. The fluid flow rate measuring device of claim 2, wherein the oscillation circuit comprises a Schmitt inverter and a resistor, the Schmitt inverter having hysteresis characteristic, the resistor being connected between an input terminal and an output terminal of the Schmitt inverter, wherein the combination capacitor is connected to the input terminal.

6. The fluid flow rate measuring device of claim 1, wherein a center angle of the common capacitor electrode is approximately 240°, and a center angle of each of the first, second and third capacitor electrodes is approximately 120°.

7. The fluid flow rate measuring device of claim 1, further comprising a strip of insulator disposed between the first, second and third capacitor electrodes so that the first, second and third capacitor electrodes are electrically isolated from each other.

8. The fluid flow rate measuring device of claim 3, further comprising a first latch, a second latch and a third latch, the first latch latching a number counted by the frequency counter in a period during which the switching circuit forms the first combination capacitor in response to the first trigger signal, the second latch latching a number counted by the frequency counter in a period during which the switching circuit forms the second combination capacitor in response to the second trigger signal, the third latch latching a number counted by the frequency counter in a period during which the switching circuit forms the third combination capacitor in response to the third trigger signal.

9. The fluid flow rate measuring device of claim 4, further comprising a first latch, a second latch and a third latch, the first latch latching a number counted by the frequency counter in a period during which the switching circuit forms the first combination capacitor in response to the first trigger signal, the second latch latching a number counted by the frequency counter in a period during which the switching circuit forms the second combination capacitor in response to the second trigger signal, the third latch latching a number counted by the frequency counter in a period during which the switching circuit forms the third combination capacitor in response to the third trigger signal.

10. A fluid flow rate measuring device comprising:
    a first circular plate comprising a fan-shaped common capacitor electrode disposed on its principal surface and insulator portion disposed on the rest of the principal surface;
    a rotation device rotating the first circular plate at a rotation speed proportional to a flow rate of a fluid;
    a second circular plate superposed above the principal surface of the first circular plate with a certain space therebetween and comprising first, second and third fan-shaped capacitor electrodes disposed on its principal surface point-symmetrically with respect to a center of its principal surface;
    a rotation detection unit detecting a capacitance of each of first, second and third capacitors each formed between the common capacitor electrode and each of the first, second and third capacitor electrodes, respectively; and
    an arithmetic unit calculating the rotation speed of the first circular plate based on the capacitance of each of the first, second and third capacitors, and calculating the flow rate of the fluid based on the rotation speed.

11. A water meter comprising:
    a first circular plate comprising a fan-shaped common capacitor electrode disposed on a principal of the first circular plate surface and an insulator portion disposed on the rest of the principal surface;
    a rotation device rotating the first circular plate at a rotation speed proportional to a flow rate of water;
    a second circular plate superposed above the principal surface of the first circular plate with a certain space therebetween and comprising a first, a second and a third fan-shaped capacitor electrodes disposed on a principal surface of the second circular plate point-symmetrically with respect to a center of its principal surface; and
    a rotation detection unit detecting a capacitance of each of first, second and third capacitors each formed between the common capacitor electrode and each of the first, second and third capacitor electrodes, respectively.

12. The water meter of claim 11, wherein the rotation detection unit comprises a switching circuit, an oscillation circuit and a frequency counter, the switching circuit forming a combination capacitor by connecting the first, second and third capacitors, the oscillation circuit comprising the combination capacitor and its oscillation frequency being modified in accordance with a capacitance of the combination capacitor, the frequency counter counting the oscillation frequency of the oscillation circuit.

13. The water meter of claim 12, wherein the switching circuit forms a first combination capacitor by grounding the second and third capacitor electrodes and connecting the first capacitor electrode to an input terminal of the oscillation circuit in response to a first trigger signal, forms a second combination capacitor by grounding the first and third capacitor electrodes and connecting the second capacitor electrode to the input terminal of the oscillation circuit in response to a second trigger signal, and forms a third combination capacitor by grounding the first and second capacitor electrodes and connecting the third capacitor electrode to the input terminal of the oscillation circuit in response to a third trigger signal.

14. The water meter of claim 12, wherein the switching circuit forms a first combination capacitor by grounding the second capacitor electrode, putting the third capacitor electrode into a floating state and connecting the first capacitor electrode to an input terminal of the oscillation circuit in response to a first trigger signal, forms a second combination capacitor by grounding the third capacitor electrode, putting the first capacitor electrode into the floating state and connecting the second capacitor electrode to the input terminal of the oscillation circuit in response to a second trigger signal, and forms a third combination capacitor by grounding the first capacitor electrode, putting the second capacitor electrode into the floating state and connecting the third capacitor electrode to the input terminal of the oscillation circuit in response to a third trigger signal.

15. The water meter of claim 12, wherein the oscillation circuit comprises a Schmitt inverter and a resistor, the Schmitt inverter having hysteresis characteristic, the resistor being connected between an input terminal and an output terminal of the Schmitt inverter, wherein the combination capacitor is connected to the input terminal.

16. The water meter of claim 11, further comprising an arithmetic unit calculating the rotation speed of the first circular plate based on the capacitance of each of the first, second and third capacitors, and calculating the flow rate of water based on the rotation speed.

17. The water meter of claim 11, wherein a center angle of the common capacitor electrode is approximately 240°, and a center angle of each of the first, second and third capacitor electrodes is approximately 120°.

18. The water meter of claim 11, further comprising a strip of insulator disposed between the first, second and third capacitor electrodes so that the first, second and third capacitor electrodes are electrically isolated from each other.

19. The water meter of claim 13, further comprising a first latch, a second latch and a third latch, the first latch latching a number counted by the frequency counter in a period during which the switching circuit forms the first combination capacitor in response to the first trigger signal, the second latch latching a number counted by the frequency counter in a period during which the switching circuit forms the second combination capacitor in response to the second trigger signal, the third latch latching a number counted by the frequency counter in a period during which the switching circuit forms the third combination capacitor in response to the third trigger signal.

20. The water meter of claim 14, further comprising a first latch, a second latch and a third latch, the first latch latching a number counted by the frequency counter in a period during which the switching circuit forms the first combination capacitor in response to the first trigger signal, the second latch latching a number counted by the frequency counter in a period during which the switching circuit forms the second combination capacitor in response to the second trigger signal, the third latch latching a number counted by the frequency counter in a period during which the switching circuit forms the third combination capacitor in response to the third trigger signal.

* * * * *